US010139232B2

United States Patent
Han et al.

(10) Patent No.: US 10,139,232 B2
(45) Date of Patent: *Nov. 27, 2018

(54) HEADING ESTIMATION FOR DETERMINING A USER'S LOCATION

(71) Applicant: Intel Corporation, Santa Clara, CA (US)

(72) Inventors: Ke Han, Shanghai (CN); Ke Ding, Shanghai (CN); Jingyi Ma, Beijing (CN); Yuhuan Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,646

(22) Filed: Oct. 30, 2017

(65) Prior Publication Data

US 2018/0058855 A1 Mar. 1, 2018

Related U.S. Application Data

(63) Continuation of application No. 14/426,604, filed as application No. PCT/CN2014/076363 on Apr. 28, 2014, now Pat. No. 9,803,982.

(30) Foreign Application Priority Data

Apr. 28, 2014 (WO) ................ PCT/CN2014/076363

(51) Int. Cl.
*G01C 21/26* (2006.01)
*G01C 21/16* (2006.01)

(52) U.S. Cl.
CPC .................................... *G01C 21/16* (2013.01)

(58) Field of Classification Search
CPC ....................................................... G01C 21/16
See application file for complete search history.

(56) References Cited

U.S. PATENT DOCUMENTS 7,509,216 B2 * 3/2009 Huddle .................. G01C 21/16
701/510
8,566,055 B1 * 10/2013 Vidmar ................ G01C 25/005
701/4

* cited by examiner

*Primary Examiner* — Richard M Camby
(74) *Attorney, Agent, or Firm* — Barnes & Thornburg LLP

(57) ABSTRACT

Technologies for determining a user's location by a mobile computing device include detecting, based on sensed inertial characteristics of the mobile computing device, that a user of the mobile computing device has taken a physical step in a direction. The mobile computing device determines a directional heading of the mobile computing device in the direction and a variation of an orientation of the mobile computing device relative to a previous orientation of the mobile computing device at a previous physical step of the user based on the sensed inertial characteristics. The mobile computing device further applies a Kalman filter to determine a heading of the user based on the determined directional heading of the mobile computing device and the variation of the orientation and determines an estimated location of the user based on the user's determined heading, an estimated step length of the user, and a previous location of the user at the previous physical step.

25 Claims, 6 Drawing Sheets

HEADING ESTIMATION FOR DETERMINING A USER'S LOCATION

CROSS REFERENCE TO RELATED APPLICATIONS

This application is a continuation of U.S. patent application Ser. No. 14/426,604, filed Mar. 6, 2015, which is a national stage entry under 35 USC § 371(b) of International Application No. PCT/CN2014/076363, which was filed Apr. 28, 2014.

BACKGROUND

Mobile navigation and location-tracking systems are commonly included on mobile computing devices such as smartphones. For example, a mobile computing device may be used to guide a user between locations using, for example, global positioning system (GPS) circuitry on the mobile computing device and referencing a geographical map. However, such systems are frequently limited to outdoor applications due to a need for network and/or GPS connectivity. Indoor navigation and location tracking solutions oftentimes track the location of the mobile computing device without relying on GPS and/or external sensors.

Mobile computing devices typically include a number of inertial sensors that collect data, which may be analyzed by, for example, an on-board inertial measurement unit (IMU) to determine various context of the user, such as the user's estimated location. "Dead reckoning" is one typical process of calculating a user's current position based on a previously determined position, estimated speed, and elapsed period of time, which may be determined based on sensor data generated by the inertial sensors. On-board inertial sensors such as accelerometers and magnetometers make it possible for mobile computing devices to count a user's steps and take compass readings for navigational purposes (i.e., for pedestrian dead reckoning). Pedestrian dead reckoning (PDR) permits indoor navigation while consuming less power (e.g., compared to GPS navigation) and requiring less a prior information.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
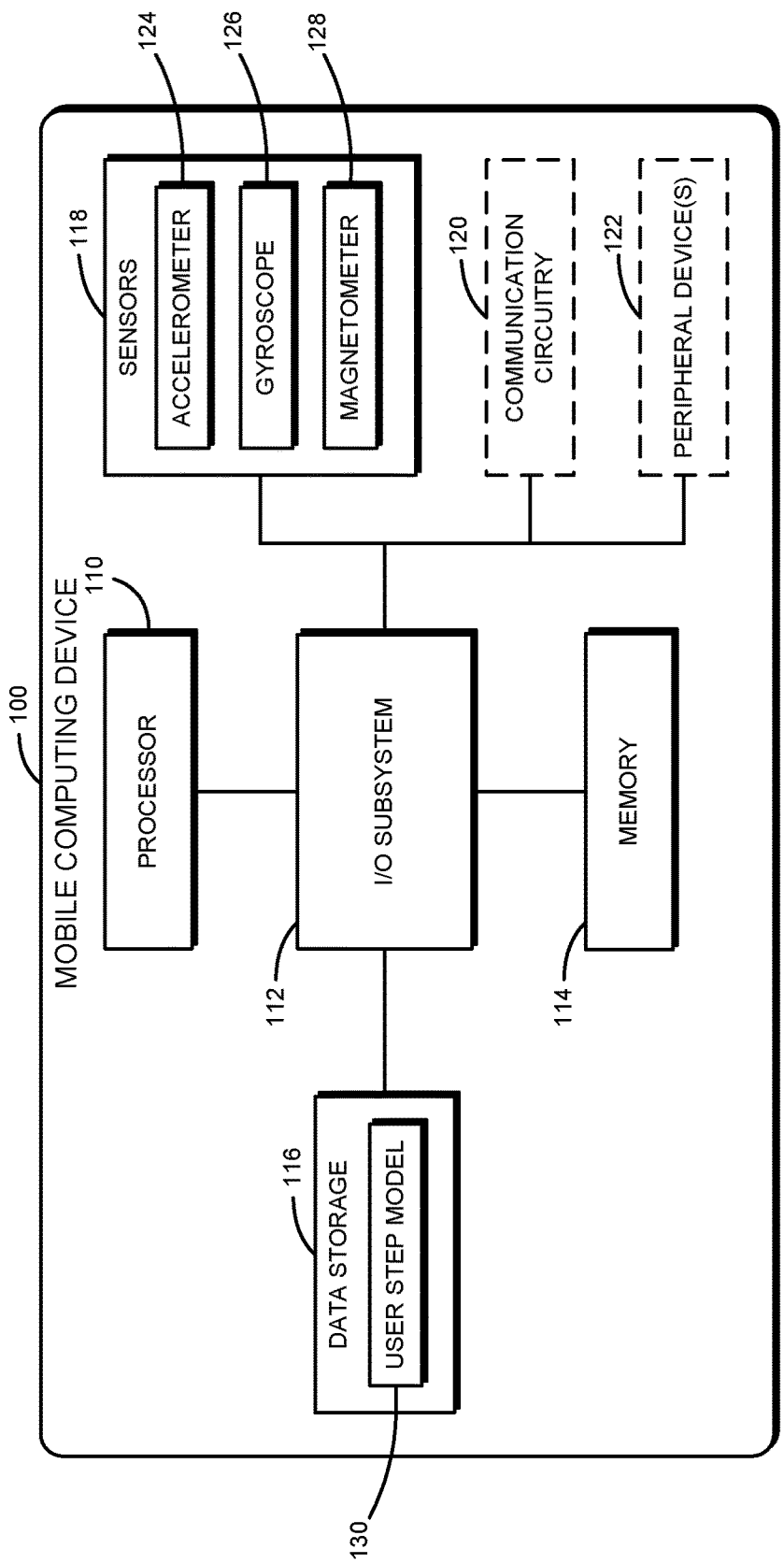
FIG. 1 is a simplified block diagram of at least one embodiment of a mobile computing device for determining a user's location.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a mobile computing device 100 for determining a user's location using pedestrian dead reckoning techniques is shown. In use, as described in more detail below, the mobile computing device 100 is configured to collect and process sensor data from a plurality of sensors of the mobile computing device 100. For example, the sensors may collect data associated with the acceleration, orientation, and/or other inertial characteristics of the mobile computing device 100. Based on an analysis of the sensor data, the mobile computing device 100 determines points in time at which the user of the mobile computing device 100 has taken a physical step (i.e., while walking, jogging, running, or having another gait). The mobile computing device 100 determines various headings of the user (e.g., raw heading, estimated heading, etc.), orientations of the mobile computing device 100 and user (e.g., relative to one another and/or to previous orientations), and a distance traveled by the user (e.g., based on the user's estimated step length). Further, as discussed below, in the illustrative embodiment, the mobile computing device 100 utilizes a Kalman filter to estimate the user's heading and appropriately handle non-step motions (e.g., tilt and rotation of the mobile computing device 100 by the user). It should be appreciated that the technologies described herein are useful and equally apply to both indoor and outdoor location tracking.

The mobile computing device 100 may be embodied as any type of computing device capable of performing the functions described herein. For example, the mobile computing device 100 may be embodied as a smartphone, cellular phone, wearable computing device, personal digital assistant, mobile Internet device, tablet computer, netbook, notebook, ultrabook, laptop computer, and/or any other mobile computing/communication device. As shown in FIG. 1, the illustrative mobile computing device 100 includes a processor 110, an input/output ("I/O") subsystem 112, a memory 114, a data storage 116, and one or more sensors 118. Of course, the mobile computing device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. In the illustrative embodiment, the data storage 116 and/or the memory 114 may store a user step model 130, sensor data, derived data (e.g., user location waypoints), and/or various other data useful during operation of the mobile computing device 100 as discussed below in regard to FIG. 2.

In the illustrative embodiment, the sensors 118 collect data associated with the acceleration, orientation, and/or other inertial characteristics of the mobile computing device 100. Of course, in some embodiments, the sensors 118 may collect other data that may be used by the mobile computing device 100 in performing the functions described herein. In various embodiments, the sensors 118 may be embodied as, or otherwise include, for example, inertial sensors, proximity sensors, optical sensors, light sensors, audio sensors, temperature sensors, motion sensors, piezoelectric sensors, pressure sensors, and/or other types of sensors that generate data useful in determining the location of a user of the computing device 100 as discussed in more detail below. For example, in the illustrative embodiment, the sensors 118 include accelerometer 124, a gyroscope 126, and a magnetometer 128. Of course, in other embodiments, the sensors 118 may include multiple accelerometers, gyroscopes, and/or magnetometers, and/or other sensors as discussed above. The accelerometer 124 may be embodied as any sensor, circuitry, and/or other components configured to measure acceleration and/or other motion of the mobile computing device 100 (e.g., along each of the three-dimensional axes of the mobile computing device 100). The gyroscope 126 may be embodied as any sensor, circuitry, and/or other components configured to measure the angular orientation of the mobile computing device 100 relative to a predefined coordinate system. That is, the gyroscope 126 may measure the roll, pitch, and/or yaw of the mobile computing device 100. The magnetometer 128 may be embodied as any sensor, circuitry, and/or other components configured to measure the magnetic field (e.g., a compass) and/or other information useful in determining the direction in which the mobile computing device 100 is pointing (e.g., with respect to due North). Of course, the mobile computing device 100 may also include components and/or devices configured to facilitate the use of the sensors 118 (e.g., an inertial measurement unit).

In some embodiments, the computing device 100 may also include communication circuitry 120. The communication circuitry 120 may be embodied as any communication circuit, device, or collection thereof, capable of enabling communications between the mobile computing device 100 and other remote devices over a network (not shown). The communication circuitry 120 may be configured to use any one or more communication technologies (e.g., wireless or wired communications) and associated protocols (e.g., Ethernet, Bluetooth®, Wi-Fi®, WiMAX, etc.) to effect such communication depending on, for example, the type of network, which may be embodied as any type of communication network capable of facilitating communication between the mobile computing device 100 and remote devices.

The computing device 100 may also include one or more peripheral devices in some embodiments. The peripheral devices 122 may include any number of additional peripheral or interface devices. The particular devices included in the peripheral devices 122 may depend on, for example, the type and/or intended use of the mobile computing device 100.

Figure 2:
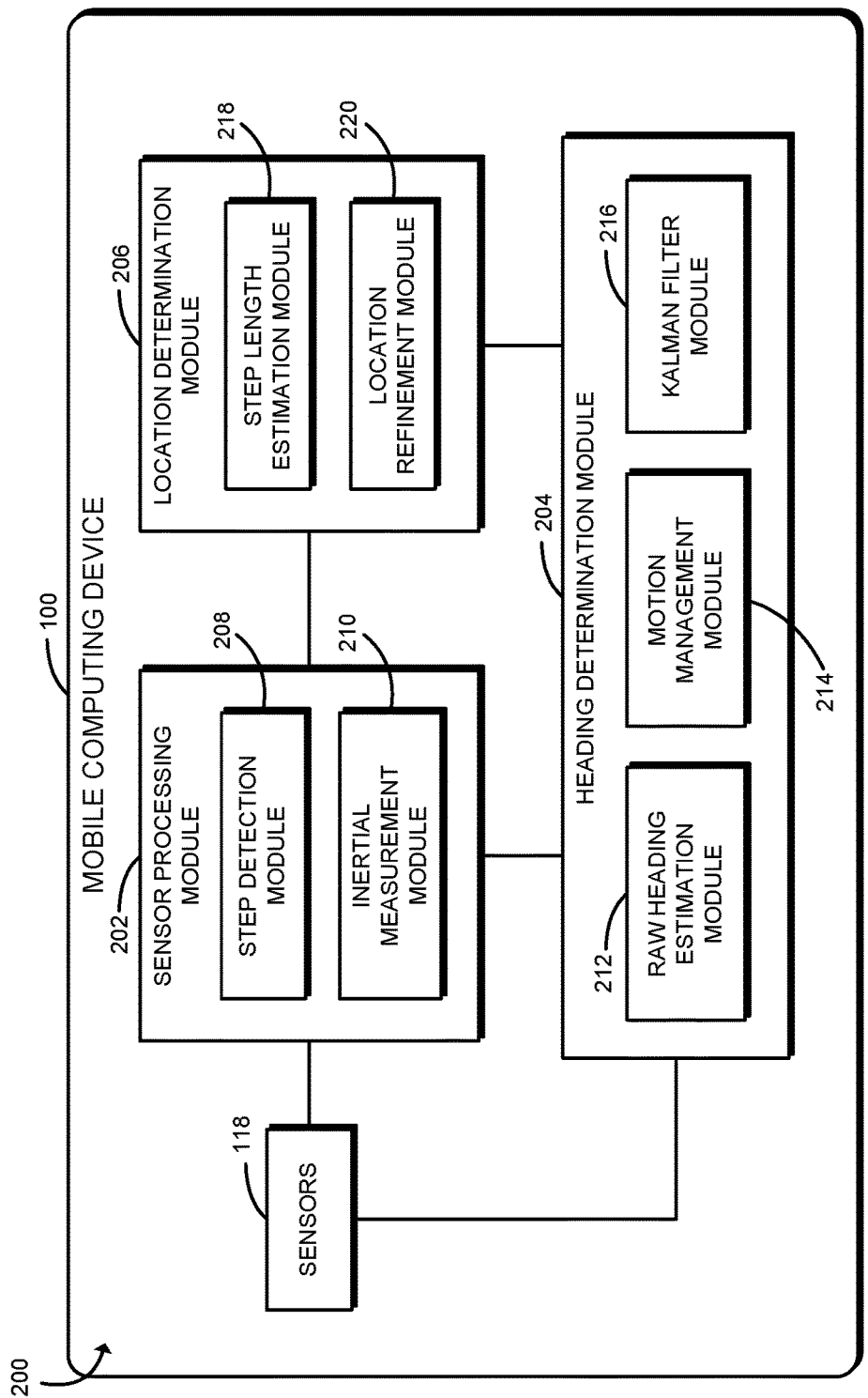
FIG. 2 is a simplified block diagram of at least one embodiment of the mobile computing device of FIG. 1.

Referring now to FIG. 2, in use, the mobile computing device 100 establishes an environment 200 for determining a user's location. As discussed below, the mobile computing device 100 estimates the user's heading and determines an estimated location of the user based on the user's estimated heading, an estimated step length of the user, and a previous location of the user (e.g., the location of the user prior to taking the step for which the user's heading was calculated). It should be appreciated that, in some embodiments, the mobile computing device 100 may determine the user's heading and/or estimate the location of the user in response to each physical step of the user. As described in greater detail below, the determined heading for one or more steps of the user and/or determined location(s) of the user may be ignored or otherwise refined based on various criteria.

The illustrative environment 200 of the mobile computing device 100 includes a sensor processing module 202, a heading determination module 204, and a location determination module 206. Additionally, the sensor processing module 202 includes a step detection module 208 and an inertial measurement module 210, and the heading determination module 204 includes a raw heading estimation module 212, a motion management module 214, and a Kalman filter module 216. Further, the location determination module 206 includes a step length estimation module 218 and a location refinement module 220. Each of the modules of the environment 200 may be embodied as hardware, software, firmware, or a combination thereof. Additionally, in some embodiments, one or more of the illustrative modules may be an independent module or form a portion of another module. For example, in some embodiments, the location refinement module 220 may be separate from the location determination module 206.

The sensor processing module 202 analyzes or processes the data collected by the sensors 118. In particular, the step detection module 208 detects when the user takes a physical step. For example, in some embodiments, the step detection module 208 determines whether the user has taken a physical step based on sensor data collected from the accelerometer 124 (e.g., by analyzing changes in the magnitude of the acceleration of the mobile computing device 100). In other embodiments, the step detection module 208 may detect physical steps of the user based on sensor data collected by another set of sensors 118. It should be appreciated that, in some embodiments, the step detection module 208 may be embodied as a pedometer or a similar module.

The inertial measurement module 210 is configured to process the sensor data associated with inertial characteristics of the mobile computing device 100. For example, the inertial measurement module 210 may convert the sensor data into a format usable by the heading determination module 204. In some embodiments, the inertial measurement module 210 may be embodied as an inertial measurement unit (IMU) configured to process data collected by the accelerometer 124, the gyroscope 126, the magnetometer 128, and/or other sensors 118 of the mobile computing device 100 to determine movement characteristics of the mobile computing device 100 such as, for example, acceleration, tilt, and orientation. It should be appreciated that the inertial measurement module 210 may be embodied as an independent module or form a portion of one or more other modules of the mobile computing device 100.

The heading determination module 204 analyzes various data to estimate a heading of the user, which may be used by the location determination module 206 to determine and/or track the location of the user. As discussed above, in the illustrative embodiment, the heading determination module 204 includes the raw heading estimation module 212, the motion management module 214, and the Kalman filter module 216.

The raw heading estimation module 212 determines a "raw" heading of the mobile computing device 100 based on the sensed inertial characteristics of the mobile computing device 100 and/or processed sensor data (e.g., from the inertial measurement module 210) and an indication that the user has taken a physical step (e.g., from the step detection module 208). In the illustrative embodiment, the raw heading estimation module 212 determines the directional heading of the mobile computing device 100 and/or the user and an orientation of the mobile computing device 100 relative to a previous orientation of the mobile computing device 100 based on, for example, sensed inertial characteristics of the mobile computing device 100. For example, the raw heading estimation module 212 may determine a variation in the orientation of the mobile computing device 100 at a current step relative to the orientation of the mobile computing device 100 at a previous step (e.g., the user's next to last step). As described below, in some embodiments, the raw heading estimation module 212 converts a sensed acceleration of the mobile computing device 100 to Earth's frame of reference and integrates the acceleration to determine a directional velocity of the mobile computing device 100. It should be appreciated that, in some circumstances, the raw heading estimation module 212 assumes the mobile computing device 100 and the user travel with the same velocity and, therefore, an estimation of the magnitude and/or direction of the velocity of the mobile computing device 100 may approximate the magnitude and/or direction of the velocity of the user. In the illustrative embodiment, the directional heading of the mobile computing device 100 is determined as, or otherwise based on, the direction of the determined velocity of the mobile computing device 100. However, in other embodiments, the magnitude of the determined velocity of the mobile computing device 100 may also be used in determining the directional heading of the mobile computing device 100.

In some cases, the user may hold the mobile computing device 100 in front of her such that the mobile computing device 100 is maintained in a fixed orientation relative to the user. In those circumstances, the movement of the mobile computing device 100 is generally limited to step motions (i.e., related to the stepping movements of the user). However, in typical circumstances, the user may hold the mobile computing device 100 in a casual manner such that the mounting position (i.e., orientation in which the mobile computing device 100 is held) may change over time. For example, the user may turn the mobile computing device 100 from a portrait orientation (i.e., zero degrees relative to the user) to a landscape orientation (i.e., ninety degrees relative to the user), place the mobile computing device 100 in her pocket, tilt the mobile computing device 100 (e.g., forward/down or backward/up), and/or otherwise reposition the mobile computing device 100. It should be appreciated that typical PDR implementations have difficulty in handling such non-step motions while minimizing/reducing error (i.e., when compared to a ground truth).

The motion management module 214 accounts for those non-step motions (e.g., tilt and rotation of the mobile computing device 100 by the user) to enable the heading determination module 204 to more accurately estimate the user's heading. To do so, the motion management module 214 may detect hand motion of the user. In particular, in the illustrative embodiment, if the motion management module 214 detects tilt (i.e., rotation in a non-horizontal plane) of the mobile computing device 100 relative to an orientation of the mobile computing device 100 at a previous step, the motion management module 214 ignores the detected physical step. As described below, the mobile computing device 100 utilizes a Kalman filter to estimate the user's heading. So, in other words, the motion management module 214 prevents data associated with the detected step from being processed by the Kalman filter, or the Kalman filter otherwise rejects the data. If the mobile computing device 100 has no relative tilt in the subsequent step, the motion management module 214 may again allow data to be transmitted to and processed by the Kalman filter. It should be appreciated that, in some embodiments, the motion management module 214 may establish a threshold amount of relative tilt by which the motion must exceed to ignore the step. Such embodiments may account for small amounts of tilt common with, for example, a stepping motion and/or motion that does not effect the accuracy of the heading estimation. In some embodiments, if not compensated for as described herein, such motions causing the mobile computing device 100 to tilt can result in a state transition error, $\varepsilon_k$, that does not approximate Gaussian or white noise.

The motion management module 214 also accounts for rotational motion along a horizontal plane. It should be appreciated that large rotational movements of the mobile computing device 100 along the horizontal plane may or may not be associated with the user's movement and, therefore, with the user's heading. For example, a large rotational movement (e.g., ninety degrees) may be associated with the user making a turn, the user spinning the mobile computing device 100 relative to herself, or a combination of those movements. If there is no tilt associated with the horizontal rotation and/or tilt not exceeding a reference threshold, the motion management module 214 does not prevent the data from being processed by the Kalman filter as described above.

It should be appreciated that, if otherwise left unaccounted for, movements of the mobile computing device 100 relative to the user may lead to inaccurate heading estimations for the user. In the illustrative embodiment, if the horizontal rotational motion exceeds a reference threshold (e.g., seventy-five degrees, ninety degrees, one hundred degrees, etc.), the motion management module 214 no longer trusts the measurements associated with the relative orientation ($O_k$–$O_{k-1}$) of the mobile computing device 100 as described below. In one particular embodiment, the reference threshold is ninety degrees of rotation as a ninety degree turn in a single physical step is unnatural and therefore uncommon. As such, the motion management module 214 reinitializes the Kalman filter and increases the Kalman filter's tolerance in error by increasing the state covariance, P, of the filter. In other words, the motion management module 214 may act as an adaptive controller to handle, at least in part, the initialization and parameters of the Kalman filter described below. It should further be appreciated that, in some circumstances, the motion management module 214 may not (or may not fully) account for the non-step motions of the mobile computing device 100.

The Kalman filter module 216 applies a Kalman filter to determine a heading of the user based on the raw heading of the mobile computing device 100 and a variation in orientation of the mobile computing device 100 (i.e., an orientation of the mobile computing device 100 relative to the orientation at the previous step). As described above, the Kalman filter module 216 may reject various data from the Kalman filter (e.g., in conjunction with the motion management module 214) and may initialize (e.g., prior to the first measured/detected step of the user) and/or reinitialize the Kalman filter at various points in time. In the illustrative embodiment, the Kalman filter module 216 applies the Kalman filter to estimate the real-time heading of the user based on an illustrative PDR model, which is described in reference to FIG. 3 below.

Figure 3:
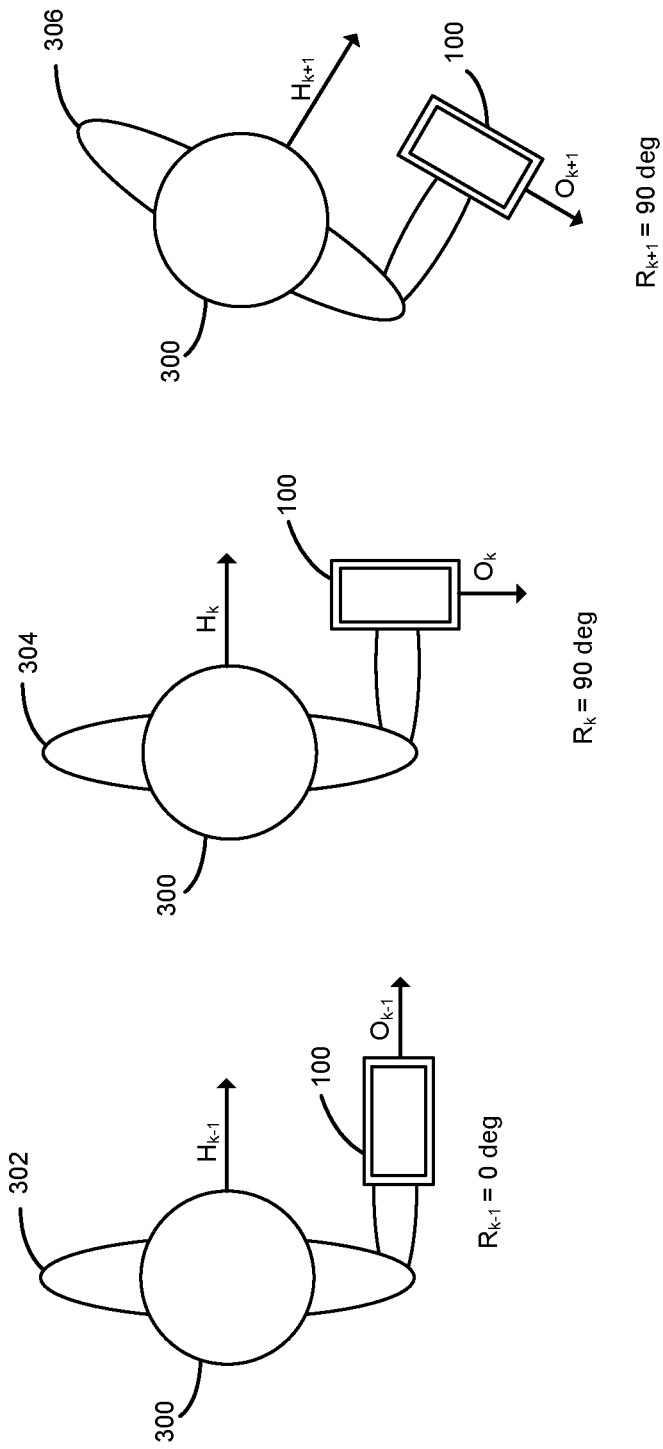
FIG. 3 are simplified illustrations of a user holding the mobile computing device of FIG. 1 in various orientations.

Referring now to FIG. 3, a user 300 is shown at different physical steps 302, 304, 306 with various headings ($H_{k-1}$, $H_k$, $H_{k+1}$) and holding the mobile computing device 100 in various orientations ($O_{k-1}$, $O_k$, $O_{k+1}$) relative to a frame of reference. In the illustrative steps 302, 304, 306, it should be appreciated that $O_k$ is the orientation of the mobile computing device 100 in the horizontal plane in step k, $H_k$ is the user's heading in step k, and $R_k$ is the relative angle between the device orientation and the user's heading in step k. More specifically, at a first step 302, the user 300 has a heading, $H_{k-1}$, of zero degrees relative to the frame of reference, the mobile computing device 100 has an orientation, $O_{k-1}$, of zero degrees, and the relative angle, $R_{k-1}$, defined therebetween is zero degrees. At a second step 304, the user 300 has a heading, $H_k$, of zero degrees, the mobile computing device 100 has an orientation, $O_k$, of ninety degrees, and the relative angle, $R_k$, is ninety degrees. Further, at a third step 306, the user 300 has a heading, $H_{k+1}$, of forty-five degrees, the mobile computing device 100 has an orientation, $O_{k+1}$, of 135 degrees and the relative angle, $R_{k+1}$, is ninety degrees.

It should be appreciated that $H_k=O_k+R_k$ at step k, and the user's heading variation in step k may be calculated in the PDR model according to $H_k-H_{k-1}=(O_k-O_{k-1})+(R_k-R_{k-1})$. In the illustrative PDR model, $O_k-O_{k-1}$ represents the variation in the orientation of the mobile computing device 100 in step k (i.e., relative to step k−1) and may be determined by the inertial measurement module 210 based on the sensed inertial characteristics of the mobile computing device 100. Further, $R_k-R_{k-1}$ represents the variation in the relative angle between the user 300 and the mobile computing device 100 in step k (i.e., relative to step k−1). In most circumstances, $R_k-R_{k-1}$ is zero because most users do not frequently change the mounting position/direction of the mobile computing device 100 during PDR.

It should be appreciated that the Kalman filter may be applied to estimate a filter state, $x_k$, based on a defined state transition function and a measurement function, $y_k$. In the illustrative embodiment, the filter state, $x_k$, is defined as the user's heading, $H_k$. In other words, $x_k=H_k$. Based on the PDR model described above, the state transition function is defined as $x_k=x_{k-1}+O_k-O_{k-1}+\varepsilon_k$, where $\varepsilon_k$ is a state transition error at step k. Additionally, as described above, $x_k$ is the determined heading of the user at step k, and $O_k$ is an orientation of the mobile computing device 100 at step k. In the illustrative embodiment, the state transition error includes the measurement error associated with determining $O_k-O_{k-1}$ and the position/direction change error, $R_k-R_{k-1}$, of the mobile computing device 100. It should be appreciated that, in the illustrative embodiment, the Kalman function assumes $R_k-R_{k-1}=0$ (e.g., to ensure stability of the filter). However, because that may not be the case, the motion management module 214 handles the circumstances in which $R_k-R_{k-1}\neq 0$ as described above. Additionally, the measurement function, $y_k$, may be defined as $y_k=x_k+\delta_k$, where $y_k$ is the raw heading of the mobile computing device 100 as described above and $\delta_k$ is a measurement error associated with integration of the acceleration of the mobile computing device 100.

Returning to FIG. 2, in the illustrative embodiment, the Kalman filter module 216 determines an estimated heading of the user by applying a linear Kalman filter having the state transition function, $x_k=x_{k-1}+O_k-O_{k-1}+\varepsilon_k$, and a measurement function, $y_k=x_k+\delta_k$, as described above. In other embodiments, the Kalman filter module 216 may apply other variations of the Kalman filter to determine the heading of the user. For example, in some embodiments, the Kalman filter module 216 may apply a Kalman filter having the state transition function, $x_k=H_k-H_{k-1}=O_k-O_{k-1}+\varepsilon_k$, and a measurement function, $y_k=x_k+H_{k-1}+\delta_k$, where $H_k$ is the estimated heading of the user at step k, $x_k$ is the estimated heading change at step k, $O_k$ is an orientation of the mobile computing device at step k, $\varepsilon_k$ is a state transition error at step k, $y_k$ is the determined directional heading (e.g., directional velocity) of the mobile computing device at step k, and $\delta_k$ is a measurement error associated with integration of an acceleration of the mobile computing device at step k. In yet other embodiments, the Kalman filter module 216 and/or the heading determination module 204 may, additionally or alternatively, apply another filter (e.g., another discrete filter for estimation) based on the PDR model described above.

The location determination module 206 determines an estimated location of the user based on the determined heading of the user, an estimated step length of the user, and the user's location at the previous physical step. For example, the location determination module 206 may determine that the user is located a distance corresponding with the user's step length away from the previous location in the direction of the user's determined heading. As discussed above, in the illustrative embodiment, the location determination module 206 includes the step length estimation module 218 and the location refinement module 220.

The step length estimation module 218 determines the estimated step length of the user based on a user step model 130. Depending on the particular embodiment, the user step model 130 may be a general model (e.g., one-size-fits-all model) for estimating the step length of the user, or the user step model 130 may be a user-specific model. In some embodiments, more than one user step model 130 may be used to estimate the step length of the user (e.g., a combination of a general model and a user-specific model). Further, in some embodiments, a user-specific user step model 130 may be generated, or a generic model adapted, after a "training period" with the user. For example, the mobile computing device 100 may request the user to take a certain number of steps and measure the distance traveled. Additionally, in some embodiments, the user step model 130 may include varying step lengths depending on whether the user is walking, jogging, running, or otherwise stepping, which may be determined based on an analysis of the sensor data collected by the sensors 118. In other embodiments, the step length estimation module 218 may determine the estimated step length of the user based on data collected by the sensors 118 of the mobile computing device 100 (e.g., with or without use of a user step model 130).

The location refinement module 220 is configured to refine the estimated location of the user based on various factors. As described above, the Kalman filter may be reinitialized by the motion management module 214 and/or the Kalman filter module 216 (e.g., in response to rotational motion of the mobile computing device 100 that exceeds the reference threshold for horizontal rotational motion). It should be appreciated that, following reinitialization, the Kalman filter requires a certain period of time to converge and become stable. Therefore, the user's location determined at points of time in which the Kalman filter is converging may be inaccurate depending on the movement of the user.

As such, in the illustrative embodiment, the location refinement module 220 refines the determined estimation location of the user in response to determining that the Kalman filter has been reinitialized and has converged. For example, the location refinement module 220 may refine the estimated locations of the user for one or more of the steps following reinitialization once the user has taken a threshold number of steps following reinitialization of the Kalman filter (e.g., two steps, three steps, five steps, ten steps, twenty steps, fifty steps, etc.). In the illustrative embodiment, the location refinement module 220 "backsteps" the user's location by recalculating the user's heading from the latest step (e.g., the threshold step) back to the first step following reinitialization to update the user headings and by recalculating the user's location with the updated user headings from the first step following reinitialization to the last step taken by the user (e.g., the threshold step). After backstepping one or more times, the Kalman filter stabilizes (i.e., unless it is reinitialized again). It should be appreciated that the location refinement module 220 may otherwise refine the determined headings and/or locations of the user in other embodiments.

Figure 4:
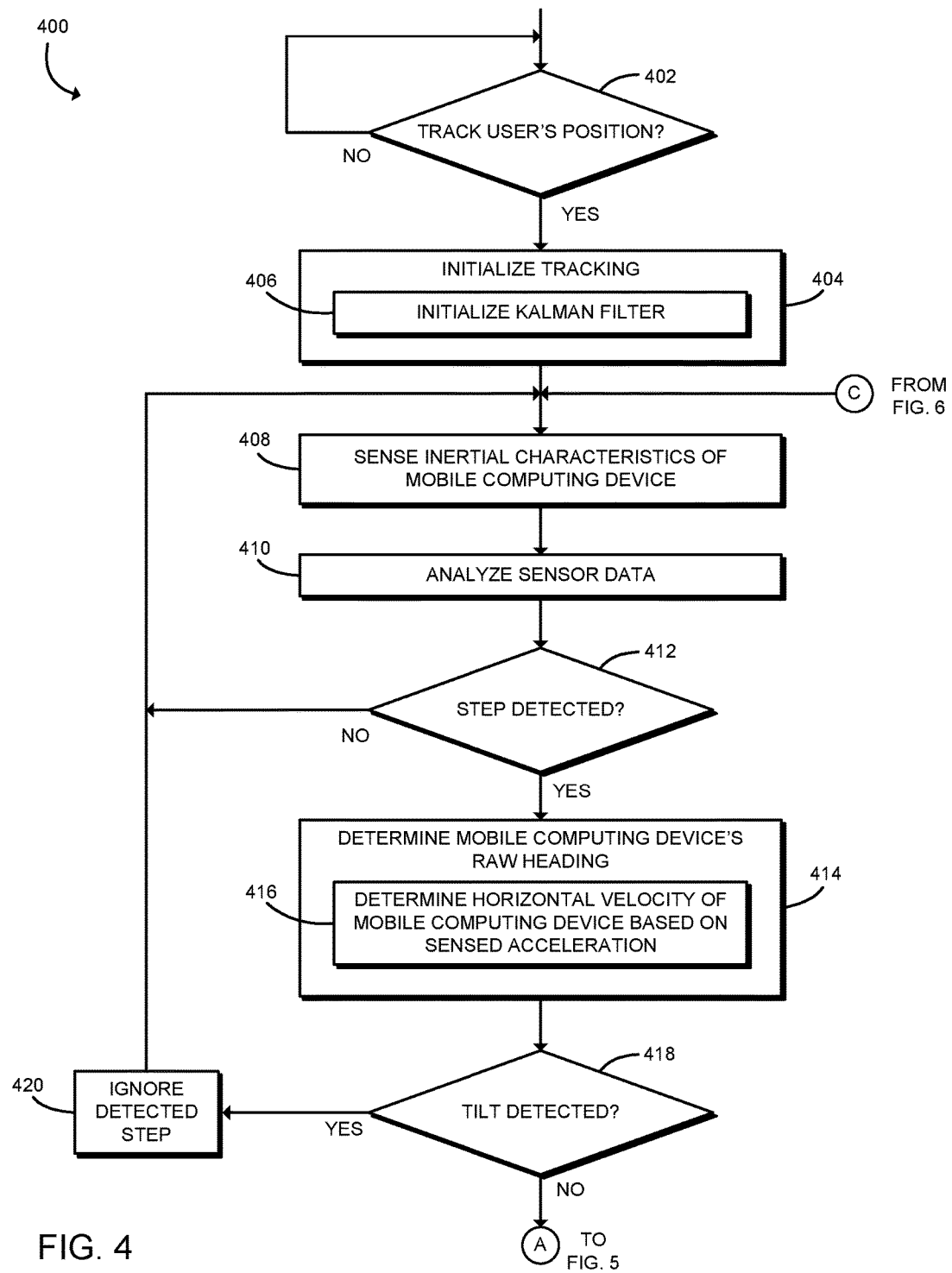
FIGS. 4-6 are a simplified flow diagram of at least one embodiment of a method for determining a user's location that may be executed by the mobile computing device of FIG. 1.
Figure 5:
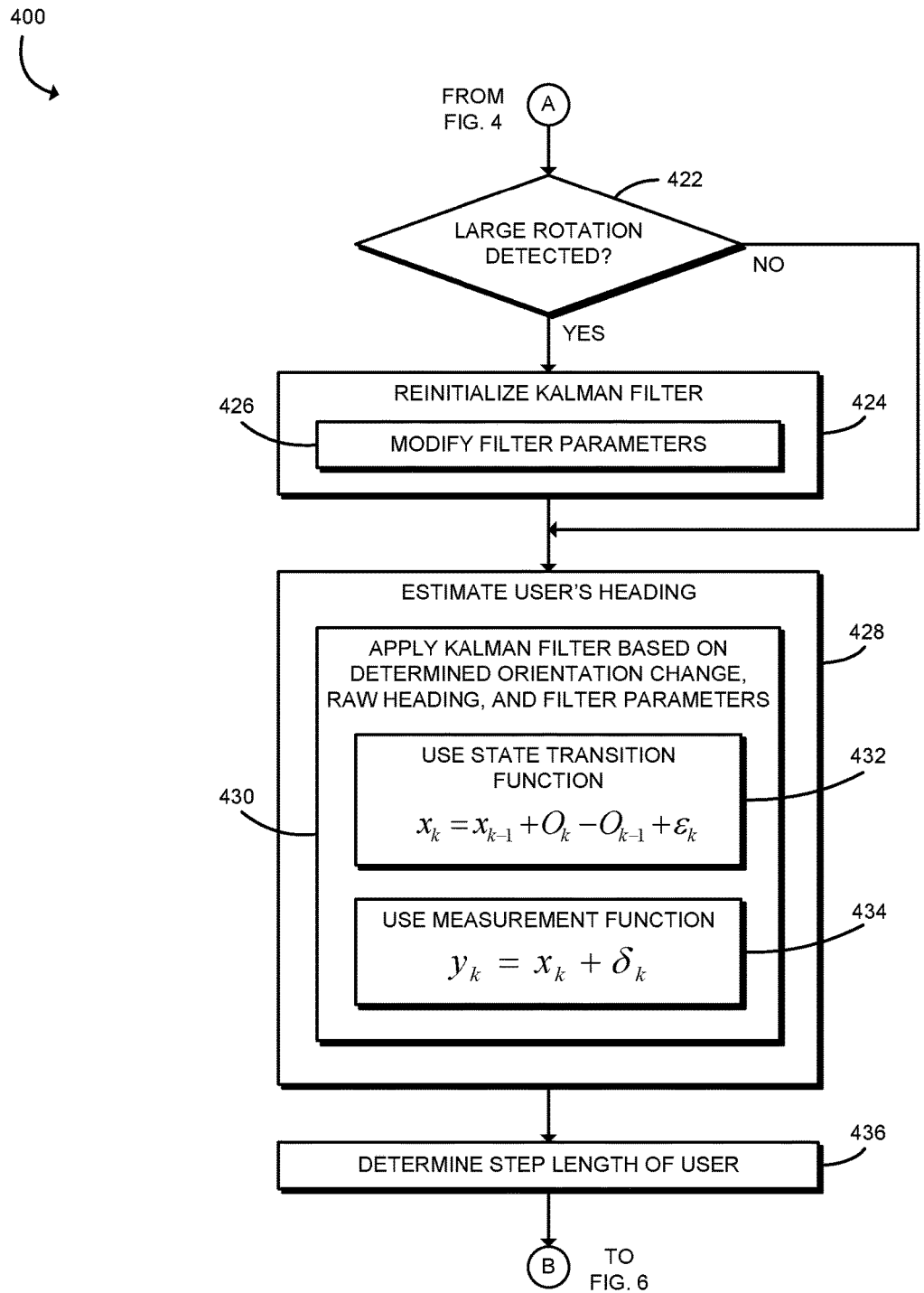
Figure 6:
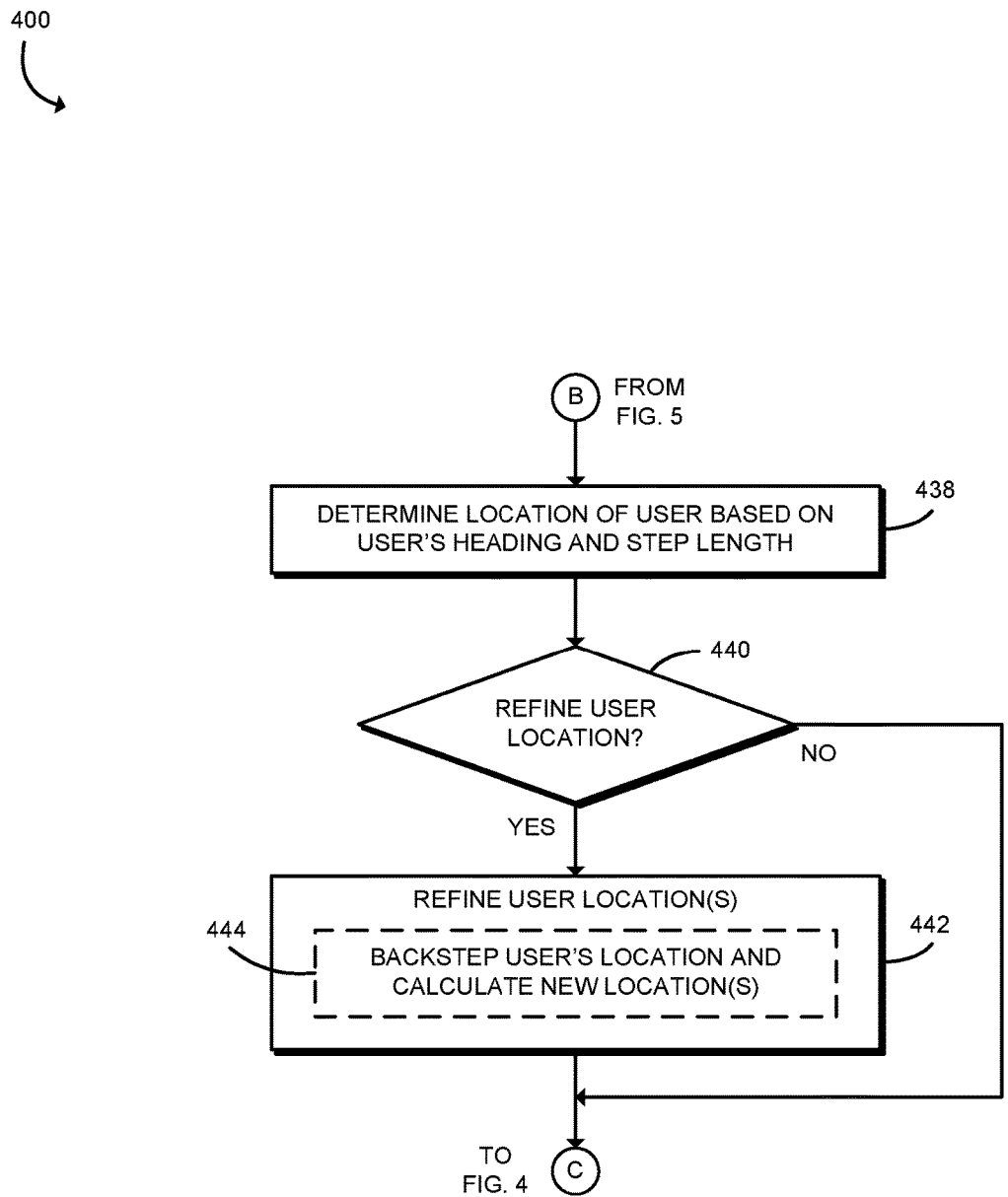

Referring now to FIGS. 4-6, in use, the mobile computing device 100 may execute a method 400 for determining a user's location (e.g., using PDR). The illustrative method 400 begins with block 402 of FIG. 4 in which the mobile computing device 100 determines whether to track the user's position/location (i.e., whether to begin PDR). If so, the mobile computing device 100 initializes tracking in block 406. For example, in block 406, the mobile computing device 100 initializes the Kalman filter based on the appropriate parameters, state transition function, and measurement function as described above. Of course, during the initialization, the mobile computing device 100 may retrieve the user step model 130 from the memory 114 or data storage 116, initialize the sensors 118 and one or more modules of the mobile computing device 100 (e.g., the inertial measurement module 210), and/or perform other initialization and configuration procedures.

In block 408, the mobile computing device 100 senses inertial and/or other characteristics of the mobile computing device 100. For example, as discussed above, the mobile computing device 100 may sense the acceleration, angular orientation (e.g., roll, pitch, and yaw), magnetic field, and/or other inertial, directional, or other characteristics of the mobile computing device 100 (e.g., characteristics relevant to a PDR analysis). In block 410, the mobile computing device 100 analyzes the collected sensor data (e.g., with an IMU) to detect, for example, when the user takes a physical step. The sensor data may be further analyzed to determine various characteristics (e.g., a raw heading of the mobile computing device 100) as described herein.

In block 412, the mobile computing device 100 determines whether a physical step has been taken by the user of the mobile computing device 100. If not, the method 400 returns to block 408 in which the mobile computing device 100 continues to collect data from the sensors 118 of the mobile computing device 100. In other words, the mobile computing device 100 waits until a step of the user has been detected. If the mobile computing device 100 determines that the user has taken a step, the mobile computing device 100 determines the user's raw heading (i.e., the directional heading of the mobile computing device 100) in block 414. As discussed above, in doing so, the mobile computing device 100 may determine the horizontal velocity of the mobile computing device 100 based on the sensed acceleration of the mobile computing device 100.

In particular, the mobile computing device 100 senses an acceleration of the mobile computing device 100 with the sensors 118 as described above. It should be appreciated that the sensed acceleration is defined with respect to a frame of reference of the mobile computing device 100 or the sensor(s) 118 that sensed the acceleration of the mobile computing device 100. In the illustrative embodiment, the mobile computing device 100 converts the sensed acceleration from the frame of reference of the mobile computing device 100 to Earth's frame of reference by virtue of a rotation matrix that defines a mapping between the two frames of reference. For example, the new acceleration in Earth's frame of reference, $a_{er}$, may be determined according to $a_{et}=A_r a_r$, where $A_r$ is the rotation matrix and $a_r$ is the sensed acceleration by the mobile computing device. It should be appreciated that the rotation matrix may be calculated using any suitable algorithm or technique.

In the illustrative embodiment, the mobile computing device 100 determines the velocity (i.e., a vector quantity) of the mobile computing device 100 by integrating (or summing) the acceleration in Earth's frame over a short period. It will be appreciated that integration or summation over an extended period of time typically introduces significant error, $\delta_k$, as described above. Accordingly, in some embodiments, the mobile computing device 100 sums the acceleration over a very small period, $\Delta t$, in an attempt to approximate the instantaneous velocity of the mobile computing device 100 and minimize the introduction of error. The velocity in Earth's frame of reference, $v_{er}$, may be determined according to $v_{et}=\Sigma a_{et}\Delta t$. In the illustrative embodiment, the mobile computing device 100 projects the velocity in Earth's frame of reference onto a horizontal plane (e.g., a horizontal plane coincident with a surface on which the user has stepped) to determine the horizontal velocity of the mobile computing device 100 in the direction in which the user has stepped. It will be appreciated that, in the illustrative embodiment, the determined horizontal velocity is the raw heading as described herein. As indicated above, in some embodiments, the directional heading of the mobile computing device 100 may ignore the magnitude of the determined horizontal velocity.

In block 418, the mobile computing device 100 determines whether a tilt (i.e., non-horizontal rotation) is detected. If so, the mobile computing device 100 ignores the detected step in block 420 and the method 400 then returns to block 408 in which the mobile computing device 100 waits until another step is detected. As discussed above, it should be appreciated that the mobile computing device 100 may utilize a reference threshold and only ignore the user's step if the amount of tilt exceeds the reference threshold.

If no tilt has been detected or the tilt does not exceed the reference threshold, the method 400 advances to block 422 of FIG. 5 in which the mobile computing device 100 determines whether a large rotation has been detected. If so, the mobile computing device 100 reinitializes the Kalman filter in block 424. In doing so, the mobile computing device 100 may modify the filter parameters in block 426. For example, as described above, the mobile computing device 100 may increase a state covariance of the Kalman filter to increase the Kalman filter's tolerance in error. As discussed above, the mobile computing device 100 may establish a reference threshold for the amount of horizontal rotational motion that constitutes a "large" rotation. In other words, if the mobile computing device 100 is rotated by an amount exceeding the threshold, the mobile computing device 100 reinitializes the Kalman filter; however, if the mobile computing device 100 is not rotated by an amount exceeding the threshold, the mobile computing device 100 does not reinitialize the Kalman filter in block 426. As described above, the mobile computing device 100 thus acts as an adaptive controller that may adjust the parameters of the Kalman filter depending on the rotational motion of the mobile computing device 100.

Regardless of whether the mobile computing device 100 reinitializes the Kalman filter, the mobile computing device 100 estimates the user's heading in block 428. As described above, to do so, the mobile computing device 100 may apply a Kalman filter based on the determined orientation change of the mobile computing device 100, $O_k-O_{k-1}$, the determined raw heading of the mobile computing device 100, $y_k$, and the filter parameters (e.g., the state covariance based on whether the Kalman filter has been reinitialized) in block 428. In particular, as shown in blocks 432 and 424, respectively, the mobile computing device 100 may apply a Kalman filter having a state transition function, $x_k=x_{k-1}+O_k-O_{k-1}+\epsilon_k$, and a measurement function, $y_k=x_k+\delta_k$, as described above. It should be appreciated that the output of the Kalman filter is the state, $x_k$, which has been defined as the user's heading as described above. Further, in some embodiments, the mobile computing device 100 may apply a different filter for determining the user's heading (e.g., the variation of the Kalman filter described above).

In block 436, the mobile computing device 100 determines the step length of the user (i.e., the length of the user's stride in the horizontal direction). For example, the mobile computing device 100 may determine the user's step length based on a user step model 132 as described above. In block 438 of FIG. 6, the mobile computing device 100 determines the location of the user based on the user's heading and the user's step length. In some embodiments, the mobile computing device 100 may determine that the user is located a distance (i.e., the step length) away from the user's previously determined location at the user's previous step in the direction of the user's heading.

In block 440, the mobile computing device 100 determines whether to refine the user's location. As discussed above, the Kalman filter may be reinitialized in response to detection of a large amount of horizontal rotation of the mobile computing device 100. In those circumstances, the Kalman filter may take a certain number of time/steps to converge and become stable again. Accordingly, the mobile computing device 100 may determine to refine (e.g., backstep) the determined location of the user a threshold number of steps following reinitialization of the Kalman filter. In block 442, the mobile computing device 100 refines the user's location. In the illustrative embodiment, the mobile computing device 100 does so by backstepping the user heading and location calculations. For example, in block 444, the mobile computing device 100 may backstep the user's location and calculate new locations. In particular, the mobile computing device 100 may recalculate the user's heading from the latest step back to the first step following reinitialization to update the user headings. Additionally, the mobile computing device 100 may recalculate the user's location with the updated user headings from the first step following reinitialization to the last step taken by the user (e.g., the threshold step). The method 400 returns to block 408 of FIG. 4 in which the mobile computing device 100 waits for detection of the next step by the user.

As described herein, the mobile computing device 100 tracks the location of the user on a step-by-step basis using heading estimation, a Kalman filter, and adaptive controls for non-step motions of the user (e.g., tilt and large rotations). In response to detecting a step by the user, the user's new location is calculated based on the user's previous location, the estimated user heading, and the estimated step length of the user. Movements of the mobile computing device 100 unrelated to the stepping motion of the user (e.g., tilting and rotations of the mobile computing device 100 relative to the user) are appropriately handled by the mobile computing device 100. Further, in certain circumstances, the mobile computing device 100 may refine the determined location of the user as described above.

EXAMPLES

Illustrative examples of the technologies disclosed herein are provided below. An embodiment of the technologies may include any one or more, and any combination of, the examples described below.

Example 1 includes a mobile computing device for determining a user's location, the mobile computing device comprising a plurality of inertial sensors to sense inertial characteristics of the mobile computing device; a sensor processing module to detect that a user of the mobile computing device has taken a physical step in a direction based on the inertial characteristics of the mobile computing device sensed by the plurality of inertial sensors; a raw heading estimation module to determine a directional heading of the mobile computing device in the direction and a variation of an orientation of the mobile computing device relative to a previous orientation of the mobile computing device at a previous physical step of the user based on the sensed inertial characteristics; a Kalman filter module to apply a Kalman filter to determine a heading of the user based on the determined directional heading and the variation of the orientation of the mobile computing device; and a location determination module to determine an estimated location of the user based on the determined heading of the user, an estimated step length of the user, and a previous location of the user at the previous physical step.

Example 2 includes the subject matter of Example 1, and wherein to detect that the user has taken a physical step, determine the directional heading of the mobile computing device and the variation of the orientation of the mobile computing device, apply the Kalman filter to determine the heading of the user, and determine the estimated location of the user comprises to detect that the user has taken a physical step, determine the directional heading of the mobile computing device and the variation of the orientation of the mobile computing device, apply the Kalman filter to determine the heading of the user, and determine the estimated location of the user for each of a plurality of sequential physical steps taken by the user.

Example 3 includes the subject matter of any of Examples 1 and 2, and further including a motion management module to (i) determine whether the mobile computing device has been tilted in a non-horizontal direction in response to a detection that the user has taken the physical step and (ii) ignore the detected physical step in response to a determination that the mobile computing device has been tilted in the non-horizontal direction.

Example 4 includes the subject matter of any of Examples 1-3, and further including a motion management module to (i) determine whether the mobile computing device has been rotated along a horizontal plane by an amount exceeding a reference threshold and (ii) reinitialize the Kalman filter in response to a determination that the mobile computing device has been rotated along the horizontal plane by an amount exceeding the reference threshold.

Example 5 includes the subject matter of any of Examples 1-4, and wherein the reference threshold is ninety degrees of rotation.

Example 6 includes the subject matter of any of Examples 1-5, and wherein to reinitialize the Kalman filter comprises to increase a state covariance of the Kalman filter to increase the Kalman filter's tolerance in error.

Example 7 includes the subject matter of any of Examples 1-6, and further including a location refinement module to refine the determined estimated location of the user in response to a determination that (i) the Kalman filter has been reinitialized and (ii) a number of physical steps taken by the user subsequent to reinitialization of the Kalman filter exceeds a reference threshold.

Example 8 includes the subject matter of any of Examples 1-7, and wherein to refine the determined estimated location comprises to update, in response to a determination that the number of physical steps taken by the user subsequent to the reinitialization has reached the reference threshold, the user's heading for each of the physical steps subsequent to the reinitialization up to the step at which the user reached the reference threshold based on the determined heading at the step at which the user reached the reference threshold; and recalculate the estimated location of the user based on the user's updated heading.

Example 9 includes the subject matter of any of Examples 1-8, and wherein to apply the Kalman filter comprises to apply a linear Kalman filter having a state transition function, $x_k = x_{k-1} + O_k - O_{k-1} + \varepsilon_k$, and a measurement function, $y_k = x_k + \delta_k$, wherein $x_k$ is the determined heading of the user at step k, $O_k$ is an orientation of the mobile computing device at step k, $\varepsilon_k$ is a state transition error at step k, $y_k$ is the determined directional heading of the mobile computing device at step k, and $\delta_k$ is a measurement error associated with integration of an acceleration of the mobile computing device at step k.

Example 10 includes the subject matter of any of Examples 1-9, and wherein to apply the Kalman filter comprises to apply a linear Kalman filter having a state transition function, $x_k = H_k - H_{k-1} = O_k - O_{k-1} + \varepsilon_k$, and a measurement function, $y_k = x_k + H_{k-1} + \delta_k$, wherein $H_k$ is an estimated heading of the user at step k, $x_k$ is an estimated heading change at step k, $O_k$ is an orientation of the mobile computing device at step k, $\varepsilon_k$ is a state transition error at step k, $y_k$ is the determined directional heading of the mobile computing device at step k, and $\delta_k$ is a measurement error associated with integration of an acceleration of the mobile computing device at step k Example 11 includes the subject matter of any of Examples 1-10, and wherein the Kalman filter module is to initialize the Kalman filter prior to a first physical step of the plurality of sequential physical steps.

Example 12 includes the subject matter of any of Examples 1-11, and wherein to determine a directional heading of the mobile computing device in the direction comprises to determine a velocity of the mobile computing device in the direction.

Example 13 includes the subject matter of any of Examples 1-12, and wherein to determine the velocity of the mobile computing device in the direction comprises to sense an acceleration of the mobile computing device with an inertial sensor of the plurality of inertial sensors; convert the sensed acceleration from a frame of reference of the inertial sensor to an acceleration in Earth's frame of reference; and determine a velocity of the mobile computing device in the direction based on the acceleration in Earth's frame of reference.

Example 14 includes the subject matter of any of Examples 1-13, and wherein to determine the velocity of the mobile computing device in the direction comprises to determine a rotation matrix mapping the frame of reference of the inertial sensor to Earth's frame of reference; apply the determined rotation matrix to the sensed acceleration to determine an acceleration of the mobile computing device in Earth's frame of reference; integrate the acceleration in Earth's frame of reference to determine a velocity in Earth's frame of reference; and project the determined velocity in Earth's frame of reference onto a horizontal plane on which the user physically stepped.

Example 15 includes the subject matter of any of Examples 1-14, and wherein the location determination module is to determine the estimated step length of the user based on a user step model.

Example 16 includes a method for determining a user's location on a mobile computing device, the method comprising detecting, by the mobile computing device and based on sensed inertial characteristics of the mobile computing device, that a user of the mobile computing device has taken a physical step in a direction; determining, by the mobile computing device, a directional heading of the mobile computing device in the direction and a variation of an orientation of the mobile computing device relative to a previous orientation of the mobile computing device at a previous physical step of the user based on the sensed inertial characteristics; applying, by the mobile computing device, a Kalman filter to determine a heading of the user based on the determined directional heading of the user and the variation of the orientation of the mobile computing device; and determining, by the mobile computing device, an estimated location of the user based on the determined heading of the user, an estimated step length of the user, and a previous location of the user at the previous physical step.

Example 17 includes the subject matter of Example 16, and wherein detecting that the user has taken a physical step, determining the directional heading of the mobile computing device and the variation of the orientation of the mobile computing device, applying the Kalman filter to determine the heading of the user, and determining the estimated location of the user comprises detecting that the user has taken a physical step, determining the directional heading of the mobile computing device and the variation of the orientation of the mobile computing device, applying the Kalman filter to determine the heading of the user, and determining the estimated location of the user for each of a plurality of sequential physical steps taken by the user.

Example 18 includes the subject matter of Example 16 and 17, and further including determining, by the mobile computing device, whether the mobile computing device has been tilted in a non-horizontal direction in response to detecting that the user has taken the physical step; and ignoring, by the mobile computing device, the detected physical step in response to determining the mobile computing device has been tilted in the non-horizontal direction.

Example 19 includes the subject matter of Example 16-18, and further including determining, by the mobile computing device, whether the mobile computing device has been rotated along a horizontal plane by an amount exceeding a reference threshold; and reinitializing, by the mobile computing device, the Kalman filter in response to determining the mobile computing device has been rotated along the horizontal plane by an amount exceeding the reference threshold.

Example 20 includes the subject matter of Example 16-19, and wherein the predetermined threshold is ninety degrees of rotation.

Example 21 includes the subject matter of Example 16-20, and wherein reinitializing the Kalman filter comprises increasing a state covariance of the Kalman filter to increase the Kalman filter's tolerance in error.

Example 22 includes the subject matter of Example 16-21, and further including refining, by the mobile computing device, the determined estimated location of the user in response to determining (i) the Kalman filter has been reinitialized and (ii) a number of physical steps taken by the user subsequent to reinitilaization of the Kalman filter exceeds a reference threshold.

Example 23 includes the subject matter of Example 16-22, and wherein refining the determined estimated location comprises updating, in response to the number of physical steps taken by the user subsequent to the reinitialization reaching the reference threshold, the user's heading for each of the physical steps subsequent to the reinitialization up to the step at which the user reached the reference threshold based on the determined heading at the step at which the user reached the referenced threshold; and recalculating the estimated location of the user based on the user's updated heading.

Example 24 includes the subject matter of Example 16-23, and wherein applying the Kalman filter comprises applying a linear Kalman filter having a state transition function, $x_k=x_{k-1}+O_k-O_{k-1}+\varepsilon_k$, and a measurement function, $y_k=x_k+\delta_k$, wherein $x_k$ is the determined heading of the user at step k, $O_k$ is an orientation of the mobile computing device at step k, $\varepsilon_k$ is a state transition error at step k, $y_k$ is the determined directional heading of the mobile computing device at step k, and $\delta_k$ is a measurement error associated with integration of an acceleration of the mobile computing device at step k.

Example 25 includes the subject matter of Example 16-24, and wherein applying the Kalman filter comprises applying a linear Kalman filter having a state transition function, $x_k=H_k-H_{k-1}=O_k-O_{k-1}+\varepsilon_k$, and a measurement function, $y_k=x_k+H_{k-1}+\delta_k$, wherein $H_k$ is an estimated heading of the user at step k, $x_k$ is an estimated heading change at step k, $O_k$ is orientation of the mobile computing device at step k, $\varepsilon_k$ is a state transition error at step k, $y_k$ is the determined directional heading of the mobile computing device at step k, and $\delta_k$ is a measurement error associated with integration of an acceleration of the mobile computing device at step k Example 26 includes the subject matter of Example 16-25, and further including initializing, by the mobile computing device, the Kalman filter prior to a first physical step of the plurality of sequential physical steps.

Example 27 includes the subject matter of Example 16-26, and wherein determining the directional heading of the mobile computing device in the direction comprises determining a velocity of the mobile computing device in the direction.

Example 28 includes the subject matter of Example 16-27, and wherein determining the velocity of the mobile computing device in the direction comprises sensing an acceleration of the mobile computing device with an inertial sensor of the mobile computing device; converting the sensed acceleration from a frame of reference of the inertial sensor to an acceleration in Earth's frame of reference; and determining a velocity of the mobile computing device in the direction based on the acceleration in Earth's frame of reference.

Example 29 includes the subject matter of Example 16-28, and wherein determining the velocity of the mobile computing device in the direction comprises determining a rotation matrix mapping the frame of reference of the inertial sensor to Earth's frame of reference; applying the determined rotation matrix to the sensed acceleration to determine an acceleration of the mobile computing device in Earth's frame of reference; integrating the acceleration in Earth's frame of reference to determine a velocity in Earth's frame of reference; and projecting the determined velocity in Earth's frame of reference onto a horizontal plane on which the user physically stepped.

Example 30 includes the subject matter of Example 16-29, and further including determining, by the mobile computing device, the estimated step length of the user based on a user step model.

Example 31 includes a computing device comprising a processor; and a memory having stored therein a plurality of instructions that when executed by the processor cause the computing device to perform the method of any of Examples 16-30.

Example 32 includes one or more machine-readable storage media comprising a plurality of instructions stored thereon that, in response to being executed, result in a computing device performing the method of any of Examples 16-30.

Example 33 includes a mobile computing device for determining a user's location, the mobile computing device comprising means for detecting, based on sensed inertial characteristics of the mobile computing device, that a user of the mobile computing device has taken a physical step in a direction; means for determining a directional heading of the mobile computing device in the direction and a variation of an orientation of the mobile computing device relative to a previous orientation of the mobile computing device at a previous physical step of the user based on the sensed inertial characteristics; means for applying a Kalman filter to determine a heading of the user based on the determined directional heading of the user and the variation of the orientation of the mobile computing device; and means for determining an estimated location of the user based on the determined heading of the user, an estimated step length of the user, and a previous location of the user at the previous physical step.

Example 34 includes the subject matter of Example 33, and wherein the means for detecting that the user has taken a physical step, the means for determining the directional heading of the mobile computing device and the variation of the orientation of the mobile computing device, the means for applying the Kalman filter to determine the heading of the user, and the means for determining the estimated location of the user comprises means for detecting that the user has taken a physical step, means for determining the directional heading of the mobile computing device and the variation of the orientation of the mobile computing device, means for applying the Kalman filter to determine the heading of the user, and means for determining the estimated location of the user for each of a plurality of sequential physical steps taken by the user.

Example 35 includes the subject matter of any of Examples 33 and 34, and further including means for determining whether the mobile computing device has been tilted in a non-horizontal direction in response to detecting that the user has taken the physical step; and means for ignoring the detected physical step in response to determining the mobile computing device has been tilted in the non-horizontal direction.

Example 36 includes the subject matter of any of Examples 33-35, and further including means for determining whether the mobile computing device has been rotated along a horizontal plane by an amount exceeding a reference threshold; and means for reinitializing the Kalman filter in response to determining the mobile computing device has been rotated along the horizontal plane by an amount exceeding the reference threshold.

Example 37 includes the subject matter of any of Examples 33-36, and wherein the predetermined threshold is ninety degrees of rotation.

Example 38 includes the subject matter of any of Examples 33-37, and wherein the means for reinitializing the Kalman filter comprises means for increasing a state covariance of the Kalman filter to increase the Kalman filter's tolerance in error.

Example 39 includes the subject matter of any of Examples 33-38, and further including means for refining the determined estimated location of the user in response to determining (i) the Kalman filter has been reinitialized and (ii) a number of physical steps taken by the user subsequent to reinitilaization of the Kalman filter exceeds a reference threshold.

Example 40 includes the subject matter of any of Examples 33-39, and wherein the means for refining the determined estimated location comprises means for updating, in response to the number of physical steps taken by the user subsequent to the reinitialization reaching the reference threshold, the user's heading for each of the physical steps subsequent to the reinitialization up to the step at which the user reached the reference threshold based on the determined heading at the step at which the user reached the referenced threshold; and means for recalculating the estimated location of the user based on the user's updated heading.

Example 41 includes the subject matter of any of Examples 33-40, and wherein the means for applying the Kalman filter comprises means for applying a linear Kalman filter having a state transition function, $x_k = x_{k-1} + O_k - O_{k-1} + \varepsilon_k$, and a measurement function, $y_k = x_k + \delta_k$, wherein $x_k$ is the determined heading of the user at step k, $O_k$ is an orientation of the mobile computing device at step k, $\varepsilon_k$ is a state transition error at step k, $y_k$ is the determined directional heading of the mobile computing device at step k, and $\delta_k$ is a measurement error associated with integration of an acceleration of the mobile computing device at step k.

Example 42 includes the subject matter of any of Examples 33-41, and wherein the means for applying the Kalman filter comprises means for applying a linear Kalman filter having a state transition function, $x_k = H_k - H_{k-1} = O_k - O_{k-1} + \varepsilon_k$, and a measurement function, $y_k = x_k + H_{k-1} + \delta_k$, wherein $H_k$ is an estimated heading of the user at step k, $x_k$ is an estimated heading change at step k, $O_k$ is an orientation of the mobile computing device at step k, $\varepsilon_k$ is a state transition error at step k, $y_k$ is the determined directional heading of the mobile computing device at step k, and $\delta_k$ is a measurement error associated with integration of an acceleration of the mobile computing device at step k Example 43 includes the subject matter of any of Examples 33-42, and further including means for initializing the Kalman filter prior to a first physical step of the plurality of sequential physical steps.

Example 44 includes the subject matter of any of Examples 33-43, and wherein the means for determining the directional heading of the mobile computing device in the direction comprises means for determining a velocity of the mobile computing device in the direction.

Example 45 includes the subject matter of any of Examples 33-44, and wherein the means for determining the velocity of the mobile computing device in the direction comprises means for sensing an acceleration of the mobile computing device with an inertial sensor of the mobile computing device; means for converting the sensed acceleration from a frame of reference of the inertial sensor to an acceleration in Earth's frame of reference; and means for determining a velocity of the mobile computing device in the direction based on the acceleration in Earth's frame of reference.

Example 46 includes the subject matter of any of Examples 33-45, and wherein the means for determining the velocity of the mobile computing device in the direction comprises means for determining a rotation matrix mapping the frame of reference of the inertial sensor to Earth's frame of reference; means for applying the determined rotation matrix to the sensed acceleration to determine an acceleration of the mobile computing device in Earth's frame of reference; means for integrating the acceleration in Earth's frame of reference to determine a velocity in Earth's frame of reference; and means for projecting the determined velocity in Earth's frame of reference onto a horizontal plane on which the user physically stepped.

Example 47 includes the subject matter of any of Examples 33-46, and further including means for determining the estimated step length of the user based on a user step model.

The invention claimed is:

1. A mobile computing device for determining a user's location, the mobile computing device comprising:
   a Kalman filter module to determine a heading of a user of the mobile computing device based on a determined directional heading of the mobile computing device and a variation of an orientation of the mobile computing device; and
   a location determination module to determine an estimated location of the user based on the determined heading of the user, an estimated step length of the user, and a previous location of the user.

2. The mobile computing device of claim 1, wherein to determine the heading of the user of the mobile computing device comprises to apply a Kalman filter.

3. The mobile computing device of claim 2, further comprising a motion management module to (i) determine whether the mobile computing device has been tilted in a non-horizontal direction in response to a detection that the user has taken a physical step and (ii) ignore the detected physical step in response to a determination that the mobile computing device has been tilted in the non-horizontal direction.

4. The mobile computing device of claim 2, further comprising a motion management module to (i) determine whether the mobile computing device has been rotated along a horizontal plane by an amount exceeding a reference threshold and (ii) reinitialize the Kalman filter in response to a determination that the mobile computing device has been rotated along the horizontal plane by an amount exceeding the reference threshold.

5. The mobile computing device of claim 4, wherein the reference threshold is ninety degrees of rotation.

6. The mobile computing device of claim 4, wherein to reinitialize the Kalman filter comprises to increase a state covariance of the Kalman filter to increase the Kalman filter's tolerance in error.

7. The mobile computing device of claim 2, further comprising a location refinement module to refine the determined estimated location of the user in response to a determination that (i) the Kalman filter has been reinitialized and (ii) a number of physical steps taken by the user subsequent to reinitialization of the Kalman filter exceeds a reference threshold.

8. The mobile computing device of claim 7, wherein to refine the determined estimated location comprises to:
   update, in response to a determination that the number of physical steps taken by the user subsequent to the reinitialization has reached the reference threshold, the user's heading for each of the physical steps subsequent to the reinitialization up to the step at which the user reached the reference threshold based on the determined heading at the step at which the user reached the reference threshold; and
   recalculate the estimated location of the user based on the user's updated heading.

9. The mobile computing device of claim 2, wherein to apply the Kalman filter comprises to apply a linear Kalman filter having a state transition function, $x_k = x_{k-1} + O_k - O_k + \varepsilon_k$, and a measurement function, $y_k = x_k + \delta_k$, wherein:
   $x_k$ is the determined heading of the user at step k,
   $O_k$ is an orientation of the mobile computing device at step k,
   $\varepsilon_k$ is a state transition error at step k,
   $y_k$ is the determined directional heading of the mobile computing device at step k, and
   $\delta_k$ is a measurement error associated with integration of an acceleration of the mobile computing device at step k.

10. The mobile computing device of claim 2, wherein to apply the Kalman filter comprises to apply a linear Kalman filter having a state transition function, $x_k = H_k - H_{k-1} = O_k - O_{k-1} + \varepsilon_k$, and a measurement function, $y_k = x_k + H_{k-1} + \delta_k$, wherein:
   $H_k$ is an estimated heading of the user at step k,
   $x_k$ is an estimated heading change at step k,
   $O_k$ is an orientation of the mobile computing device at step k,
   $\varepsilon_k$ is a state transition error at step k,
   $y_k$ is the determined directional heading of the mobile computing device at step k, and
   $\delta_k$ is a measurement error associated with integration of an acceleration of the mobile computing device at step k.

11. The mobile computing device of claim 1, further comprising a directional heading estimation module to determine a directional heading of the mobile computing device and a velocity of the mobile computing device in the direction.

12. The mobile computing device of claim 11, wherein to determine the velocity of the mobile computing device in the direction comprises to:
   sense an acceleration of the mobile computing device with an inertial sensor;
   convert the sensed acceleration from a frame of reference of the inertial sensor to an acceleration in Earth's frame of reference; and
   determine a velocity of the mobile computing device in the direction based on the acceleration in Earth's frame of reference.

13. The mobile computing device of claim 12, wherein to determine the velocity of the mobile computing device in the direction comprises to:
   determine a rotation matrix mapping the frame of reference of the inertial sensor to Earth's frame of reference;
   apply the determined rotation matrix to the sensed acceleration to determine an acceleration of the mobile computing device in Earth's frame of reference;
   integrate the acceleration in Earth's frame of reference to determine a velocity in Earth's frame of reference; and
   project the determined velocity in Earth's frame of reference onto a horizontal plane on which the user physically stepped.

14. One or more machine-readable storage media comprising a plurality of instructions stored thereon that, in response to execution by a mobile computing device, cause the mobile computing device to:

determine a heading of a user of the mobile computing device based on a determined directional heading of the mobile computing device and a variation of an orientation of the mobile computing device; and determine an estimated location of the user based on the determined heading of the user, an estimated step length of the user, and a previous location of the user.

15. The one or more machine-readable storage media of claim 14, wherein to determine the heading of the user of the mobile computing device comprises to apply a Kalman filter.

16. The one or more machine-readable storage media of claim 15, wherein the plurality of instructions further cause the mobile computing device to:

determine whether the mobile computing device has been tilted in a non-horizontal direction in response to detecting that the user has taken a physical step; and ignore the detected physical step in response to determining the mobile computing device has been tilted in the non-horizontal direction.

17. The one or more machine-readable storage media of claim 15, wherein the plurality of instructions further cause the mobile computing device to:

determine whether the mobile computing device has been rotated along a horizontal plane by an amount exceeding a reference threshold; and reinitialize the Kalman filter in response to determining the mobile computing device has been rotated along the horizontal plane by an amount exceeding the reference threshold.

18. The one or more machine-readable storage media of claim 15, wherein the plurality of instructions further cause the mobile computing device to refine the determined estimated location of the user in response to determining (i) the Kalman filter has been reinitialized and (ii) a number of physical steps taken by the user subsequent to reinitilaization of the Kalman filter exceeds a reference threshold.

19. The one or more machine-readable storage media of claim 18, wherein to refine the determined estimated location comprises to:

update, in response to the number of physical steps taken by the user subsequent to the reinitialization reaching the reference threshold, the user's heading for each of the physical steps subsequent to the reinitialization up to the step at which the user reached the reference threshold based on the determined heading at the step at which the user reached the referenced threshold; and recalculate the estimated location of the user based on the user's updated heading.

20. The one or more machine-readable storage media of claim 15, wherein to apply the Kalman filter comprises to apply a linear Kalman filter having a state transition function, $x_k = x_{k-1} + O_k - O_k + \varepsilon_k$, and a measurement function, $y_k = x_k + \delta_k$, wherein:

$x_k$ is the determined heading of the user at step k, $O_k$ is an orientation of the mobile computing device at step k, $\varepsilon_k$ is a state transition error at step k, $y_k$ is the determined directional heading of the mobile computing device at step k, and $\delta_k$ is a measurement error associated with integration of an acceleration of the mobile computing device at step k.

21. The one or more machine-readable storage media of claim 14, wherein the plurality of instructions further cause the mobile computing device to determine the directional heading of the mobile computing device in the direction and determine a velocity of the mobile computing device in the direction.

22. The one or more machine-readable storage media of claim 14, wherein the plurality of instructions further cause the mobile computing device to determine the estimated step length of the user based on a user step model.

23. A method for determining a user's location on a mobile computing device, the method comprising:

determining, by the mobile computing device, a heading of a user of the computing device based on a determined directional heading of the mobile computing device and a variation of an orientation of the mobile computing device; and determining, by the mobile computing device, an estimated location of the user based on the determined heading of the user, an estimated step length of the user, and a previous location of the user.

24. The method of claim 23, wherein determining the heading of the user of the mobile computing device comprises applying a Kalman filter.

25. The method of claim 24, further comprising:

determining, by the mobile computing device, whether the mobile computing device has been tilted in a non-horizontal direction in response to detecting that the user has taken a physical step;

ignoring, by the mobile computing device, the detected physical step in response to determining the mobile computing device has been tilted in the non-horizontal direction;

determining, by the mobile computing device, whether the mobile computing device has been rotated along a horizontal plane by an amount exceeding a reference threshold; and reinitializing, by the mobile computing device, the Kalman filter in response to determining the mobile computing device has been rotated along the horizontal plane by an amount exceeding the reference threshold.

* * * * *